2,969,706

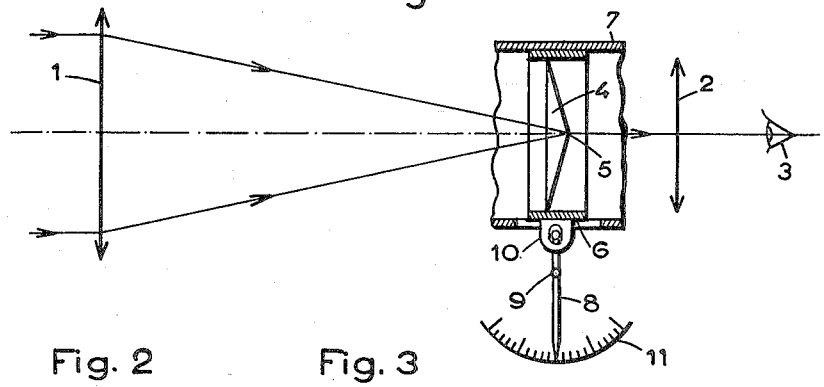
Fig. 1
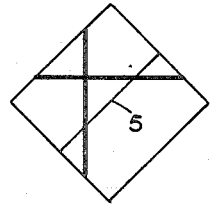
Fig. 2
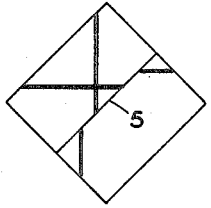
Fig. 3
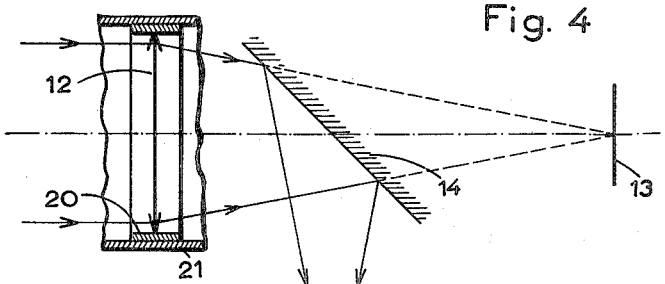
Fig. 4
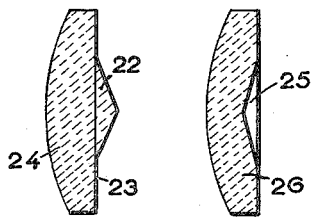
Fig. 5    Fig. 6
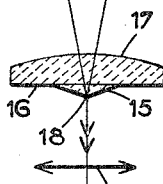
Fig. 7    Fig. 8
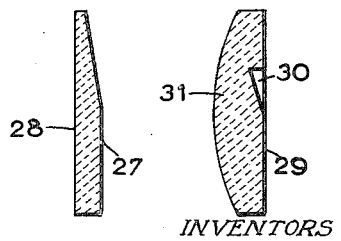
INVENTORS
Raymond Rosier and
Jean-Michel Baluteau
BY Cameron, Kerkam & Sutton
ATTORNEYS

OPTICAL RANGE-FINDER

Raymond Rosier, Asnieres, and Jean-Michel Baluteau, Paris, France, assignors to Societe d'Optique et de Mecanique de Haute Precision, Paris, France, a company of France Filed May 9, 1957, Ser. No. 658,171

Claims priority, application France May 11, 1956

3 Claims. (Cl. 88—2.4)

The invention relates to an optical range-finder, that is to say an appliance allowing the distance between a point sighted and the range-finder to be optically determined.

The optical range-finder forming the subject of the invention can be used not only as an appliance for measuring distance, but also for bringing a photographic or cinematographic objective into focus when the distance of the subject sighted is unknown.

In optical range-finders wherein the base is taken on a single objective, adjustment is carried out by observing lack of focus, that is to say lack of coincidence between the plane of the image formed by the objective of the range-finder and a fixed reference plane.

In general, an optical device which transforms the lack of focus into discontinuity on certain lines of the image is placed in the position where the image of the point sighted is formed. This optical device is a cylindrical lens, an assembly of spherical lenses, or even an assembly of prisms.

Known devices often give good results, but are nevertheless often critical in construction, above all when only small numbers are required to be made, and have the disadvantage of producing parallax at coincidence, and furthermore in certain cases of requiring the eye to be in a fixed position in relation to the appliance.

The invention overcomes the disadvantages of known systems, while exhibiting their advantages.

According to the invention, the optical range-finder comprises an objective, a prism whereof the intersection angle is disposed in a plane perpendicular to the mean ray passing through the objective, and in the region where the true image formed by the rays which have passed through the objective is situated, and means for making the plane of the image coincide with the plane perpendicular to the main ray, the latter plane containing the intersection angle of the prism.

In the definition of the invention which has just been given, and hereinafter, the expression mean ray passing through the objective designates in practice the optical axis of the objective at the instant of passing through the objective. However, the expression optical axis has been replaced by mean ray, since, as will be seen hereinafter, the intersection angle of the prism may be not perpendicular to the optical axis of the objective because an additional optical element, such as a totally reflective prism or a mirror, is interposed between the objective and the prism. In this case, the intersection angle of the prism is simply perpendicular to the light ray which merged with the optical axis while passing through the objective.

Furthermore, it may be stated what is understood by the word prism. As will in fact be seen hereinafter, the prism which can be used for the range-finder according to the invention is simply a dihedron formed by two plane faces separating two spaces of different optical indices. In particular, a glass prism may be used, that is to say a glass dihedron whereof the angle is less than 180°, or an air dihedron may be used, that is to say bounded by glass surfaces, the angle of the air dihedron being less than 180° C.

Certain embodiments of the invention will now be described by way of example with reference to the accompanying drawings.

Figure 1 is a longitudinal diagrammatic section through a range-finder allowing the distance between an object and the range-finder to be determined.

Figure 2 represents an object observed in the range-finder when the latter is focussed.

Figure 3 is a view similar to that illustrated in Figure 2, the range-finder being out of focus.

Figure 4 is a longitudinal diagrammatic section through a photographic appliance of the so-called reflex type, comprising a range-finding focussing device according to the invention.

Figure 5 illustrates a prism which can be used for the range-finder according to the invention, the said prism being situated on the plane face of a condenser lens.

Figure 6 also illustrates a prism which can be used, the said prism consisting of an air dihedron bounded by faces formed in a condenser lens.

Figure 7 illustrates another variant of embodiment of a prism which can be used.

Figure 8 illustrates a condenser lens incorporating an air prism corresponding to the prism illustrated in Figure 7.

The range-finder according to the invention illustrated in Figure 1 comprises an objective 1 and an eye-piece 2. The eye 3 observes any object through the objective and the eye-piece.

The range-finder also comprises a prism 4 whereof the intersection angle 5 is disposed in the zone in which the objective forms the image of the object sighted.

The prism 4 is mounted in a movable support 6, capable for example of being displaced in a tube 7.

The prism 4 can therefore be displaced so that its intersection angle 5 is brought into the plane wherein the image is formed.

The movements of the prism can be transmitted to any device which automatically gives the distance of the object under observation. In fact, the position of the image depends on the distance of the object under observation, and since, as will be seen later, focussing of the range-finder according to the invention requires the intersection angle 5 of the prism to be situated in the plane of the image formed by the objective 1, each position of the prism 4 corresponds to a distance of the object under observation.

Figure 1 shows a needle 8 mounted on a pivot 9, and driven by a lug 10 attached to the support 6. The end of the needle 8 moves along a scale 11 calibrated in object distances.

The image formed by the objective 1 being perpendicular to its optical axis, the intersection angle 5 of the prism 4 must be situated in the plane perpendicular to the optical axis of the objective, or in general to the mean ray passing through the objective.

Under these conditions, when the intersection angle 5 of the prism is situated in the plane of the image formed by the objective, the image does not appear distorted to the eye 3, which sees it through the eye-piece 2.

If, on the other hand, the intersection angle 5 of the prism is not in the plane of the image, a clearly apparent discontinuity is produced along the intersection angle in consequence of the fact that the two portions of the image separated by the intersection angle 5 of the prism are deflected perpendicularly to the said intersection angle.

In order that the discontinuities may be observed both on the vertical lines and on the horizontal lines, the intersection angle of 5 of the prism is obliquely disposed, for example at 45°, as illustrated in Figures 2 and 3.

Figure 2 illustrates what the eye observes when the range-finder is in focus, the object sighted being a cross consisting of a vertical line and a horizontal line.

Figure 3 illustrates what the eye observes when the same object is sighted, but the range-finder is not in focus, the image being formed behind the intersection angle. In this case, the two parts of the image separated by the intersection angle 5 are brought closer together, and are no longer in alignment along the intersection angle.

As may be easily understood, the range-finder which has just been described is both accurate and easy to use. It has no disadvantage as regards parallax, and the line separating the two parts of the image, that is to say the intersection angle 5 of the prism, is always extremely fine, and can be easily and accurately observed, even if the eye is not always situated in the same position with respect to the prism.

The rays which reach the eye 3 after refraction in the prism proceed from two different areas of the objective 1. It is clear that the relative aperture of the objective sets a lower limit to the angle of the dihedron forming the intersection angle 5. The choice of a fairly obtuse angle is advantageous, in order not to introduce any chromatic errors of such a kind as to have an adverse effect on the quality of the image.

Figure 4 illustrates how the invention is used in the case of photographic appliances equipped with sighting means of the so-called "reflex" type.

In the case illustrated in the figure, the objective of the range-finder is the shooting objective 12. Between the objective 12 and the photographic film 13 is disposed a partially reflective fixed mirror 14, inclined at 45° to the optical axis of the objective. The mirror 14 directs the image produced by the objective on to a prism 15 cemented to the plane face 16 of a condenser lens 17. The intersection angle 18 of the prism 15 is perpendicular to the mean ray proceeding from the objective 12.

Observation is effected via an eye-piece 19.

In the case of the appliance illustrated in the figure, the prism 15 is so disposed that its intersection angle 18 is in the plane of the image when the object under observation is at infinity.

When a closer object is under observation, the plane of the image moves with respect to the intersection angle 18, and the range-finder is no longer in focus. The objective 12 is moved in order to re-focus the range-finder. For this purpose, the objective 12 is mounted on a movable supoprt 20, which can for example be displaced in a tube 21.

The appliance which has just been described therefore allows the photographic appliance to be brought into focus simultaneously with the range-finder, that is to say, makes it certain that the image is formed in the plane of the film 13.

It would also be possible to use a range-finder according to the invention should the objective of the range-finder not also be that of the photographic appliance. An independent objective may be used, and may simply be coupled to the view-finder objective.

If the field is small, as for example in the case of telephoto objectives, the prism can cover the whole of the image.

On the other hand, if the objective has a large field, the prism will only be able to cover the central region.

It may be cemented to a strip having parallel faces, or to the plane face of a condenser lens, or can even be caused to hold simply by molecular adherence.

Figure 5 illustrates a prism 22 attached to the plane face 23 of a condenser lens 24.

For manufacture in large numbers, the prism and condenser lens may be moulded in one piece. The prism can project, or can be hollow, as illustrated in Figure 6, the prism 25 then consisting of air and being disposed in a condenser lens 26 consisting of plastic material.

Finally, the prism could be constructed as illustrated in Figure 7, with a face 27 parallel to the base 28. The portion of the field covered by the face 27 is then not deflected at all.

The prism illustrated in Figure 8 gives a result similar to that obtained with the prism illustrated in Figure 7. In fact, the prism illustrated in Figure 8 is of the air type, and consists on the one hand of a portion 29 of the plane face, and on the other hand of a hollow portion 30, the latter being accommodated in a condenser lens 31 consisting of moulded material.

The invention is naturally not limited to the methods of embodiment which have just been illustrated, which can be modified in detail without departing from the scope of the invention.

For example, the intersection angle of the prism could be horizontal or vertical instead of oblique, the prism could be of a different shape from those illustrated in the drawings, and the base of the prism need not be perpendicular to the mean ray which has passed through the objective.

What we claim is:

1. An optical range finder having an eye piece, and a prism mounted in a movable support for movement along the optical axis of the range finder between the objective and the eye piece, said prism having two surfaces intersecting in a straight line forming the apex of the intersection angle, which line is disposed in a plane perpendicular to said optical axis and in the region of the image plane formed by rays passing through said objective, and means coupled to said movable support for imparting motion thereto whereby said planes may be brought into coincidence.

2. An optical range finder as described in claim 1 in which the straight line forming the apex of the intersection angle is disposed obliquely with respect to the horizontal.

3. An optical range finder as described in claim 1 including a semi-transparent mirror disposed obliquely with respect to the optical axis of the range finder between said objective and said prism.

References Cited in the file of this patent

UNITED STATES PATENTS

| 1,339,235 | Taylor | May 4, 1920 |
| 1,572,236 | Frederick | Feb. 9, 1926 |
| 1,918,548 | Konig | July 18, 1933 |
| 2,080,352 | Weisse | May 11, 1937 |
| 2,241,185 | Cohen | May 6, 1941 |
| 2,341,410 | Mihalyi | Feb. 8, 1944 |

FOREIGN PATENTS

| 850,264 | Germany | Sept. 22, 1952 |

OTHER REFERENCES

"Focussing With Crossed Prisms," article by Dodin, published in Amateur Photographer, April 10, 1946, pp. 243 and 245.